Feb. 20, 1968  M. S. TAUSIG  3,370,217
POWER SUPPLY CONTROLLED VOLTAGE CURRENT CHARACTERISTICS
Filed April 7, 1965  2 Sheets-Sheet 1

INVENTOR.
MARTIN S. TAUSIG
BY
ATTY.

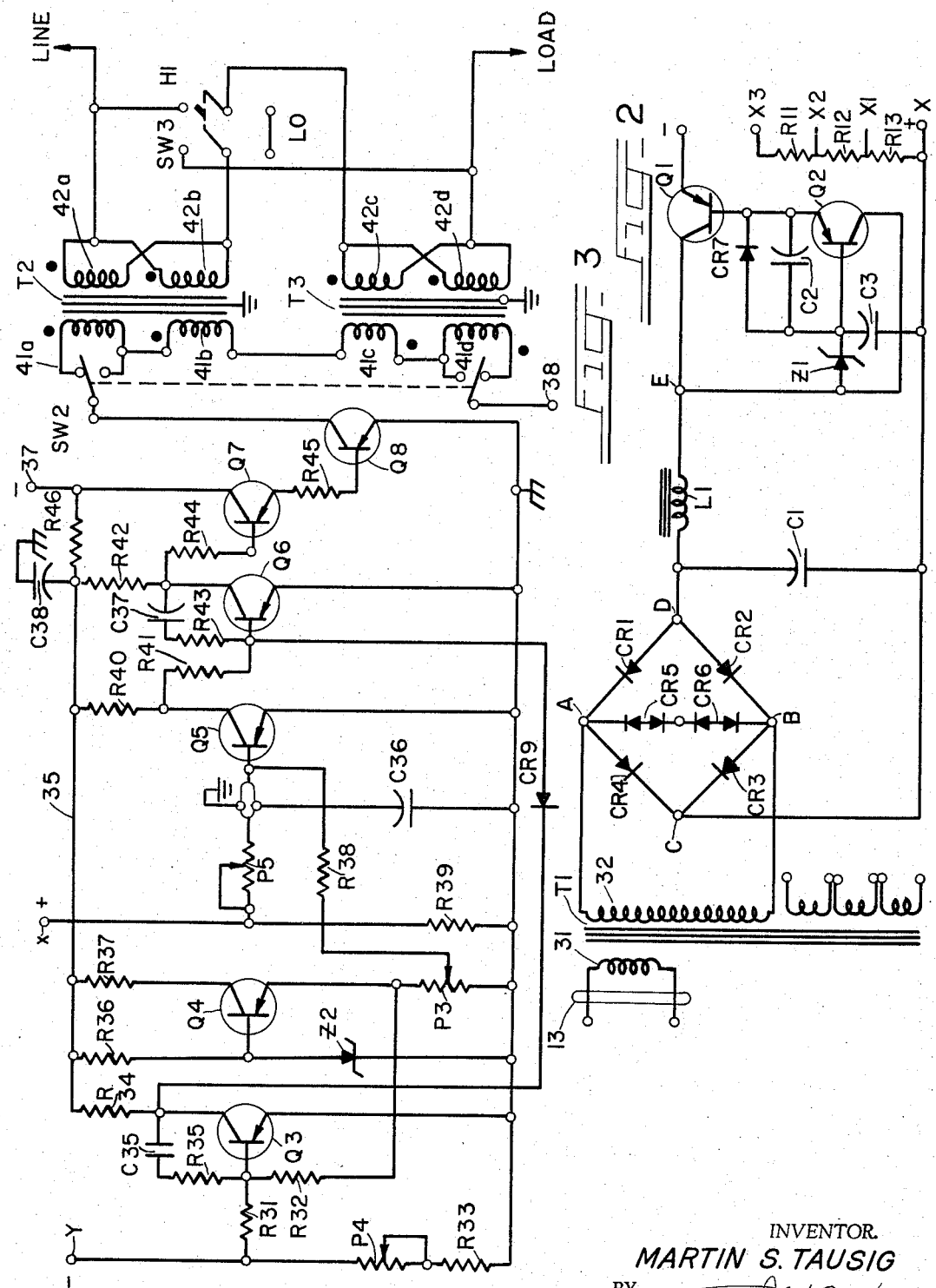

United States Patent Office 3,370,217
Patented Feb. 20, 1968

3,370,217
POWER SUPPLY CONTROLLED VOLTAGE CURRENT CHARACTERISTICS
Martin S. Tausig, Chicago, Ill.
(2431 Eric Circle, Madison, Wis. 53706)
Filed Apr. 7, 1965, Ser. No. 446,254
9 Claims. (Cl. 321—11)

ABSTRACT OF THE DISCLOSURE

High voltage D.C. power supply using a control reactor in series with a high voltage line transformer that is coupled to a diode bridge rectifier. The output of the bridge after regulation is fed back to the reactor through a cross-over amplifier to control D.C. damping of the reactor.

---

This invention relates to regulated power supplies and more particularly, to circuitry using negative feedback control to regulate the voltage-current characteristics of high-voltage power supplies.

Electronic equipment has become increasingly more sophisticated. It has become evident that regulated power supplies presently available do not provide the degree of control of both voltage and current that is required by the new generation of electronic utilization equipment.

One area wherein power supplies providing regulated current and voltage are required is the growing field of electro medical equipment. For example, power supplies used for electro-phoresis, must supply the simultaneous regulation of the voltage and current required. The problem in this particular area is compounded since the voltage output required is in the order of 1200 volts.

Accordingly, it is an object of the present invention to provide new and unique regulated high-voltage power supplies.

A related object of the present invention is to provide power sources using feedback to control the current regulation as well as the voltage regulation, thus, in effect a circuit that controls the voltage-current output characteristics is provided.

A further object of this invention is to provide a highly reliable transistorized reactor controlled, regulated power source.

According to one embodiment of the inventive regulator circuitry, a full wave voltage rectifier is coupled to the line through a high voltage transformer. The output of the rectifier is filtered and regulated. The filtered regulated output is degeneratively fed back through a transistorized cross-over amplifier. The negative filtered, regulated output is used for current sensing in the amplifier while the positive output is used for voltage sensing. The amplifier controls the amount of damping D.C. that flows through a control reactor that is in series between the line and the high voltage transformer.

The degenerative feedback thus increases or decreases the series impedance presented by the reactor as a function of the output current and voltage.

These and other objects, features and advantages of the invention will become apparent from the following specification when read in conjunction with the accompanying drawings, in which:

FIG. 2 is a schematic of the regulated power supply without the feedback circuitry;

FIG. 3 is a schematic showing of the feedback arrangement including the regulating amplifier and control reactor;

Figure 1:
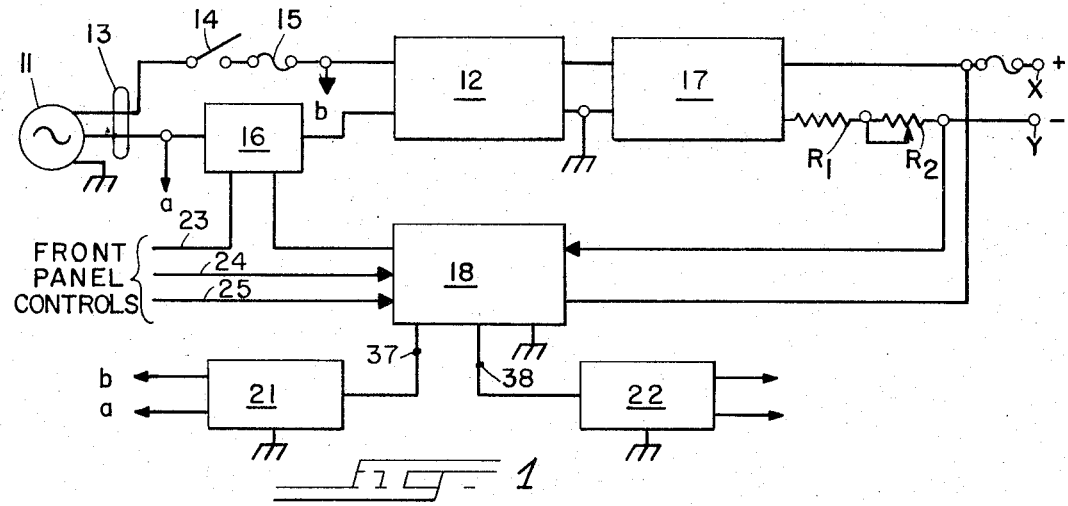
FIG. 1 is a block diagram of the inventive regulated power supply showing the feedback arrangement.

By referring now to FIG. 1, wherein the regulated power supply is illustrated in block diagram form, the over-all functioning of the inventive circuitry will be explained. A source of A.C. power is shown symbolically as generator 11. The A.C. power from generator 11 is connected to a high voltage transformer and rectifier, the combination shown as block 12 through a power line 13. A power switch 14 and fuse 15 are located on one side of the line 13, and a control reactor 16 is located on the other side of the line. Thus, the high voltage transformer and rectifier of block 12 receive power when switch 14 is closed. The amount of power received is automatically controlled by control reactor 16.

The output of block 12 is filtered and regulated by an electronic filter illustrated in FIG. 1 by block 17. The electronic filter 17 provides a filtered regulated D.C. output. However, the output voltage-current characteristic provided by block 17 is not sufficiently controlled for the use in modern sophisticated implemental circuits.

To improve the control, a regulating feedback amplifier 18 is provided. The amplifier 18 senses the current and voltage outputs of filter 17 and responsive thereto controls the flow of D.C. current through reactor 16. By controlling the flow of D.C. current through the reactor 16 the saturation of the core, and hence the impedance of the reactor 16 is controlled. By controlling the impedance of reactor 16, the input to the transformer and rectifier arrangement 17 is controlled. These controls are exercised to increase the output regulation of both the voltage and the current at output terminals $x$ and $y$. The regulation of the voltage and current outputs is maintained even over wide variations of output load and input supply voltage levels.

In greater detail, regulating amplifier 18 is connected in parallel with the output terminals $x$, $y$. The positive terminal $x$ is connected to the positive terminal of electronic filter 17. The negative terminal $y$ may be coupled to the negative terminal of electronic filter 17 through the serial resistive circuit comprising resistor R1 and variable resistor R2.

Separate power supplies provide the amplifier 18 with bias supplies as required. These independent power supplies 21 and 22 are connected to the power line 13 at points $a$, $b$ which obviously are between the A.C. source 11 and the high voltage transformer of block 12. Independent supply 21, in the embodiment of the invention described herein, provides −12 volts at 100 ma., while supply 22 provides −6 volts at 3.5 a.

Controls at the front of the inventive regulator circuit allow an operator to vary the volt-ampere characteristics of the output. As will be described in greater detail as this description unfolds, the front panel of the inventive equipment is provided with range select control 23, voltage control 24 and current control 25.

FIG. 2 shows the details of blocks 12 and 17 of FIG. 1. A high voltage transformer T1 is coupled to an A.C. source through power line 13 connected to the primary winding 31 of transformer T1. The transformer T1 is designed to step up the input voltage. In one preferred embodiment of the invention the A.C. source was 120 v. The transformer provided a 1200 v., 1200 ma. output.

The high voltage output of transformer T1 is connected to a bridge-type full wave rectifier. In greater detail, a diode bridge comprised of rectifiers CR1, CR2, CR3 and CR4 is provided.

The rectifiers are connected so that if point A is positive, current will flow through rectifier CR4, to point C, through the bridge load, into point D from the load, and through rectifier CR2 to point B, which is negative when point A is positive.

When point B is positive, current then flows through rectifier CR3 to point C, through the load to point D and back to point A which is now at negative potential. Thus, in the well known manner of the full wave bridge rectifier circuit, point C is always at positive potential and point D is always supplied with a negative potential.

It should be understood that the bridge type rectifier circuit is shown as a preferred embodiment since other types of rectifier circuits would be adequate for the purposes of this invention.

To prevent any damage to the diode rectifiers which could easily occur if the supply voltage increases beyond the capability of the rectifiers used in the bridge, applicant provides two pair of back to back rectifiers CR5 and CR6. These rectifiers are back biased and adapted to break down to provide a path across the secondary winding of transformer T1 before the voltage across the secondary winding is sufficient to damage the rectifiers CR1–CR4. Normally, the diodes CR5, CR6 do not have any effect on the operation of the circuit, since they present an extremely high impedance across the windings. When they break down due to an overvoltage condition, they provide a by-pass path allowing the current to flow around the rectifier CR1–CR4.

Capacitor input type filter means are provided for the output of the bridge rectifier. This is part of the circuitry of block 17 of FIG. 1.

In greater detail, the electronic filter of block 17 of FIG. 1 comprises a capacitor C1 connected across output points C, D of the bridge 33. An inductor L1 is connected between output terminal $x$ and the junction of capacitor C1 with point D.

The other end of inductor L1 is connected to the collector terminal of transistor Q1. The collector of transistor Q1 acts to maintain a stable negative voltage. If the voltage at the output of inductor L1 rises, then the internal impedance of transistor Q1 automatically is increased. The internal impedance of transistor Q1 is in series with the load and thus, acts as a voltage divider with respect to the load. In a similar manner, the impedance of transistor Q1 decreases automatically as the voltage output of the bridge 33, and consequently filter inductor L1 decreases. In addition, filter capacitor C2 is effectively connected to the output end of inductor L1 to shunt the load.

In greater detail, consider for example, what occurs when the voltage at point E increases. Note that point E is connected to the zener diode Z1 and to the collector of transistors Q1, Q2. The other side of the zener diode is connected through diode CR7 and capacitor C2 in parallel to the base of transistor Q1, directly to the base of transistor Q2, and through filter capacitor C3 to the positive output of the bridge.

When the voltage at point E increases, the voltage at the collectors of transistors Q1, Q2 increase. The voltage of zener diode Z1 stays substantially constant as is characteristic of such diodes. The base voltages of the transistors remain constant since the bases of the transistors are tied to the zener output. Hence, the base to collector voltage increases. The collectors of the transistors Q1, Q2 connected as shown in the emitter follower configuration tend to follow the respective bases. Thus, the voltage between the base and collector of the emitter collector transistors increases while the output at the emitters remains constant. Transistor Q2 tends to amplify this condition. Thus, in effect the transistors Q1, Q2 tend to amplify the filtering effect of capacitor C3 on the ripple voltage.

The diode CR7 acts to further filter any negative surges which may occur through transistor Q2. Thus, the output voltage of the electronic filter tends to be stable.

The negative output of the electronic filter 17 is designated in FIG. 2 just as it was in FIG. 1. FIG. 2 however, shows an optional arrangement for the positive terminal $x$. As shown therein, series resistors R11, R12, and R13 can be coupled between the output and the load. The load can be connected to any of the taps $x1$, $x2$ or $x3$. Circuit 17 is, however, vulnerable to current surges, which among other things, would tend to destroy transistor Q1.

The regulating amplifier 18 is designed to overcome, among other things, the problem of large current variations. The regulating amplifier 18 comprises six transistors stages which are shown in detail in FIG. 3. While the transistors are depicted in this embodiment as PNP transistors, it should be apparent to those skilled in the art that NPN transistors or a combination of NPN and PNP transistors can be used merely by using the proper biasing arrangement.

Point $y$ the negative output of circuit 17 is coupled to the base of a first amplifier, a PNP transistor Q3, through resistor R31 in circuit 18. Resistor R31 is part of the voltage divider network consisting of resistors R31, R32 and potentiometer P3 connected to ground. The voltage divider network is bridged by potentiometer P4 and limiting resistor R33 connected between point $y$ and ground. Potentiometer P4, is the current control designated the numeral 25 on the front panel in FIG. 1.

The emitter of the transistor Q3 is connected directly to ground. The collector of transistor Q3 is connected to the negative D.C. voltage bus 35 through load resistor R34. The collector of transistor Q3 is connected to the base through the integrating feedback network comprising capacitor C5 in series with resistor R35. The feedback arrangement tends to maintain current flow through the transistor Q3 once it is activated to conductance.

The second transistor of circuit 18 serves to mix the positive and negative inputs. More specifically, the emitter of PNP transistor Q4 is connected to ground through potentiometer P3. The base of transistor Q4 is coupled to the junction of resistor R36 and zener diode Z2. The resistor R36 and the zener diode Z2 form a series circuit extending from negative voltage bus 35 to ground. Thus, the base of transistor Q4 is biased by the contact zener voltage, regardless of any variations in the voltage of bias 35. The collector of transistor Q4 is tied to bus 35, through resistor R37. With transistor Q4 connected as described it acts to control the current flow through potentiometer P3 in conjunction with the negative voltage applied at point $y$.

The wiper of potentiometer P3 is connected to the base of a second amplifying transistor, the PNP transistor Q5, through resistor R38. The bias on the base of transistor Q5 however is dependent not only on the potentiometer P3 voltage but also on the positive voltage taken from point $x$ at the output of the electronic filter 17, best shown in FIG. 2. It should be noted that amplitude of that voltage is dependent upon whether the output is tapped at points $x$, $x1$, $x2$, or $x3$ (FIG. 2).

The positive voltage, at any rate, is connected to the base of transistor Q5 through potentiometer P5. The junction of point $x$ and potentiometer P5 is connected to ground through biasing resistor R39. Thus, the amplitude of the positive voltage applied to the base of transistor Q5 is a function of the setting of potentiometer P5, the voltage control designated voltage control 24 in FIG. 1. The amplitude of the voltage applied to the base of transistor Q5 is a function of the setting of potentiometers P3, P4 and P5. For most purposes, the settings of potentiometers P3, P4 and P5 are such that transistor Q5 remains in a quiescent state when the output voltage and current at points $x$, $y$ are as required. If the current through point $y$ varies or the voltage at point $x$ varies, then transistor Q5 is actuated to its active state.

It has been found that for best results the lead from potentiometer P5 to transistor Q5 should be shielded and the shielding should be grounded as shown. In addition, it has been found that more reliable results are obtained if the shielding is also connected to ground through capacitor C36.

The emitter of transistor Q5 is tied directly to ground. The collector of the transistor Q5 is connected to the negative voltage bus 35 through load resistor R40. When transistor Q5 is in its normal quiescent condition its collector is at the potential of the negative bus 35. When transistor Q5 is switched to its conductive state then its collector is effectively at ground potential.

The next transistor stage is the amplifier comprising PNP transistor Q6. The collector of transistor Q5 is tied to the base of transistor Q6 through D.C. coupling resistor R41. The collector of transistor Q3 is also coupled to the base of transistor Q6 through coupling diode CR9.

The emitter of transistor Q6 is coupled directly to ground. The collector of transistor Q6 is connected to the negative voltage bus 35 through resistor R42. Thus, if either of transistors Q3 or Q5 are in their non-conducting states, transistor Q6 is biased to its conducting state, since its base is then more negative than its emitter.

The collector of transistor Q6 is effectively at the potential of the negative voltage bias when the transistor Q6 is in its non-conducting state and effectively at ground potential when transistor Q6 is in its conducting state. An integrating feedback circuit comprising capacitor C37 in series with resistor R43 couples the base and the collector of transistor Q6 and acts to maintain the transistor Q6 in its conductive state for a time period determined by the product RC.

The next stage comprises switching transistor Q7. The collector of transistor Q6 is connected through D.C. coupling resistor R44 to the base of PNP transistor Q7. The emitter of transistor Q7 is connected to the base of transistor Q8 through D.C. coupling resistor R45. Transistor Q8 comprises an amplifying transistor and is the final transistor stage in circuit 18. The collector of Q7 is coupled directly to the negative bias voltage source 37. The negative bias voltage source 37 is coupled to the negative voltage bus 35 through resistor R46. Filter capacitor C38 serves to bypass ripple voltage to ground.

The transistor Q7 controls the base bias voltage of transistor Q8. When transistor Q6 is in its non-conducting state the collector of transistor Q6 and hence, the base of transistor Q7 is, for practical purposes, at the voltage of the negative voltage bus 35. As the base of transistor Q7 goes more negative, its emitter also is driven more negative, consequently, the base of transistor Q8 is driven more negative, causing more D.C. current to pass through the emitter to collect circuit of transistor Q8. On the other hand, when transistor Q6 is in its conducting state, then its collector is effectively at ground potential. This puts the base of transistor Q7 at ground potential. The emitter of transistor Q7 follows its base since transistor Q7 is connected in an emitter follower type configuration. Thus, the base of transistor Q8 is then effectively grounded. This, of course, increases the emitter to base impedance tending to block the flow of current through the emitter-to-collector circuit of the transistor Q8.

The emitter of transistor Q8 is connected directly to ground. The collector of transistor Q8 is connected to the negative voltage output of the D.C. damping current power supply 22 at terminal 38 through the primary windings 41a to 41d of reactor transformers T2, T3.

As the D.C. current flows through the primary windings of reactor transformers T2 and T3, the reactor cores tend to saturate and hence, the A.C. impedance decreases allowing more current to flow through the transformers T2, T3 secondary windings 42a–42d. The reactor windings 42a–42d are in series between A.C. power source and the high voltage transformer of circuit 12 of FIG. 1. (Also shown as transformer T1 in FIG. 2.)

Switch SW2 is in series with the primary windings of the reactor transformer T2. When the switch SW2 is in the position shown in FIG. 3, the primary windings present the maximum resistance to the flow of current therethrough. When the switch SW2 is actuated to remove windings 41a and 41d then the maximum direct current flows through the primary windings to saturate the reactor transformer in less current-time.

The secondary windings of control reactor 16 are in series between the power source (line) and the circuit 12 (load). The secondary windings of the reactor 16 are all connected in parallel, when switch SW3 is in the "Hi" position. This is the maximum line current position. When switch SW3 is in the "Lo" position, winding 42a is parallel with winding 42b are connected in series with windings 42c and 42d in parallel. This is the low line current position. As is best shown in FIG. 1, the range switch SW3 appears as control 23 on the front panel of the inventive embodiment described herein.

Summarizing the operation of the regulating amplifier 18, just described, it is noted that when the current in the load tends to go to high, for example, then the D.C. damping current flow through the primary windings of reactor transformers T2, T3 is impeded. This occurs when the base of transistor Q8 tends to a less negative potential. When transistor Q7 is in its non-conducting state the base of transistor Q8 tends to be less negative Transistor Q7 does not conduct when its base is grounded which occurs when transistor Q6 conducts.

Transistor Q6 conducts when its base is biased sufficiently negative. The base of transistor Q6 is biased negatively when either transistor Q3 or transistor Q5 are blocked. Then the potential of the voltage bus is transmitted through a path comprising either resistor R35, diode CR9, resistor R41, or resistors R40 and R41 to the base of transistor Q6. The base of transistor Q6 tied to the junction point of resistor R41 and crystal CR9 is driven to a negative potential, thus switching to its conductive state.

Transistor Q5 conducts as a function of the negative potential received through resistor R38 from the wiper of potentiometer P3 and the positive potential received through potentiometer P5 from high voltage positive terminal x. The negative potential on potentiometer P3 depends on the setting of potentiometer P4 and the current flow through negative terminal y. Thus, for example, if the load current decreases the current flowing through amplifier 18 in parallel with the load tends to increase. Responsive to the increased current through the voltage divider network comprising resistors R31, R32 and potentiometer P3, the base of transistor Q3 is driven more negative so that more current flows in the collector to emitter circuit. This causes the collector of the transistor to become more positive. This change in transistor Q3 collector potential is blocked by diode CR9.

However, the increased negative voltage at the wiper of potentiometer P3 effectively is greater than the normal increase in positive voltage at terminal x caused by the greater load impedance. Thus, the base of transistor Q5 is driven more negative. Hence, transistor Q5 conducts a larger current over its emitter-to-collector circuit causing its collector to go towards ground potential. When the collector of transistor Q5 goes toward ground transistor Q6 current flow is impeded. Consequently, transistor Q7 biases transistor Q8 to conduct an increased D.C. damping current. The increased damping current lowers the impedance of the series reactor because it tends to saturate the core. It should be noted that a square hysteresis loop type core is preferred though not essential in the embodiment of the invention discussed herein. The lowered series impedance, from line to load, tends to raise the current flow through the load back to normal.

In a similar manner, if the load current increases, the impedance of the reactor would automatically increase to bring the load current back to normal.

A voltage decrease is sensed at termianl x. Such a decrease would tend to bias transistor Q5 to greater current flow. The greater current flow through transistor Q5 would tend to bring the collector of Q5 to ground potential and decrease the negative bias on the base of transistor Q6. The decreased bias on Q6 would cause a decrease in emitter-to-collector current through transistor Q6. The decrease current of transistor Q6 would tend to increase the negative bias of transistor Q7 and consequetly, of transistor Q8. The increased negative bias in transistors Q7, Q8 would allow more D.C. current to flow through the reactor thereby decreasing the series impedance of reactor 16. The drop in series impedance would naturally increase the voltage across the load, thus restoring the regulated output to its normal condition. The reaction of the circuit would be just the opposite if the output voltage would tend to increase.

Thus, while each instance has been analyzed separately it should be obvious that the inventive circuitry acts to automatically control the output voltage current characteristics when the output voltage and/or currents vary either because of load changes or line changes.

Figure 4:
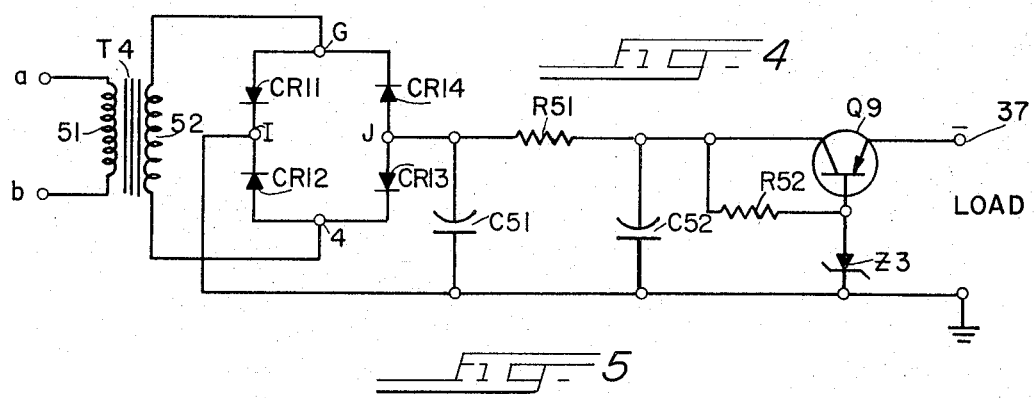
FIG. 4 is a schematic showing of the regulated collector supply voltage source.

FIG. 4 is a schematic diagram of the regulated negative bias voltage supply used with amplifier circuit 18. Points $a$ and $b$ of power line 13 are connected to the primary windings 51 of step down transformer T4. The secondary winding of transformer T4 terminates in the well known full wave bridge rectifier configuration. In greater detail, the top of secondary winding 52 is designated point G. The bottom of the secondary winding is designated point H. The positive output of the bridge is designated point I, while the negative output is designated point J. Diode CR11 is connected between points G and I. Diode CR12 is between points I and H. Diode CR13 is between points H and J, while diode CR14 is between points J and G. The negative output at point J is connected to the top of filter capacitor C51 which bridges the output. Resistor R51 is coupled between point J and the load. Another filter capacitor C52 bridges the output.

The filtered output is regulated. That is, the output at the junction of resistor R51 and capaictor C52 is connected to the collector of a PNP transistor Q9. The base of the transistor Q9 is connected to ground through zener diode Z3. The zener diode is supplied its firing current through resistor R52. The other side of resistor R52 is connected to the junction of the emitter of transistor Q9 and resistor R51. The emitter of transistor Q9 is coupled to terminal 37 which, as illustrated in FIG. 3 and described above, is connected to the negative voltage bus 35 through resistor R46.

When power is supplied to the primary of transformer T4 full wave, filtered and rectified voltage is supplied across capacitor C52. Current flows through resistor R52 and zener diode Z3, firing the zener. The constant zener voltage is coupled to the base of transistor Q9. Since the load is connected to the emitter of transistor Q9 the emitter tends to follow the base and maintain the constant voltage. The impedance between the collector and the base varies to maintain the constant output at terminal 37.

Figure 5:
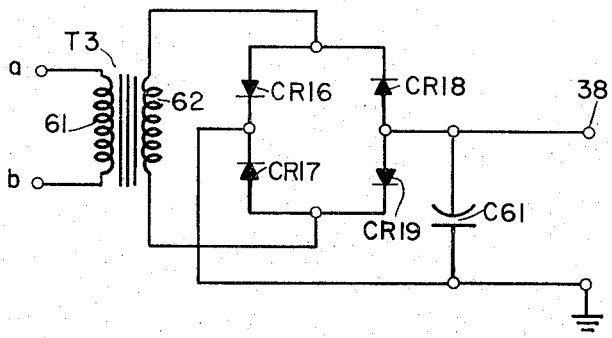
FIG. 5 is a schematic of the D.C. damping voltage supply.

FIG. 5 illustrates an embodiment of the damping current supply utilized in carrying out the present invention. It represents a full wave bridge rectifier. The step-down transformer T5 has its primary winding 61 connected across the terminals $a$, $b$ of power line 13. The secondary winding 62 is connected across the bridge comprising diode rectifiers CR16, CR17, CR18 and CR19. The transformer is connected to the junction of diodes CR16 and CR18 on one side and diodes CR17 and CR19 on the other side. The negative terminal 38 is connected to the junction of diode CR18 and CR19 while the junction of diodes CR16, CR17 is connected to ground. Terminal 38 is the same terminal described and illustrated in connection with FIG. 3 where it is shown as connected to the primary winding of reactor transformer T3. Filter capacitor C61 is connected from terminal 38 to ground and acts as a ripple filter.

One preferred embodiment of the inventive circuitry gave extremely satisfactory results when built with components having the following values and/or suppliers.

RESISTORS

| Designation | Ohmic Value | Ratins, watts | Designation | Ohmic Value | Rating, watts |
|---|---|---|---|---|---|
| R1 | 47K | 2 | R39 | 470K | ½ |
| R2 | 100K | 2 | R40 | 10K | ¼ |
| R3 | 100K | 2 | R41 | 1K | ¼ |
| R31 | 2K | ¼ | R42 | 4.7K | ¼ |
| R32 | 10K | ¼ | R43 | 4.7K | ¼ |
| R33 | 24K | 1 | R44 | 1K | ¼ |
| R34 | 1K | ¼ | R45 | 75K | 1 |
| R35 | 680K | ¼ | R46 | 150K | ¼ |
| R36 | 7K | ¼ | R51 | 47K | 1 |
| R37 | 560K | ¼ | R52 | 1K | ¼ |
| R38 | 33K | ¼ | | | |

Potentiometers:
P3 _____ 500 ohms; 2 w.; Carbon; linear.
P4 _____ 75 ohms; 5 w.; W.W.; Linear "WP."
P5 _____ 50 ohms; 2 w.; "AB"; Linear.

CAPACITORS

| Designation | Value, Mfd. | Rating, v. |
|---|---|---|
| C1 | 5 | 1,200 |
| C2 | .05 | 100 |
| C3 | 1 | 1,500 |
| C35 | 50 | 15 |
| C36 | 1 | 15 |
| C37 | 100 | 15 |
| C38 | 200 | 10 |
| C51 | 1,000 | 15 |
| C52 | 1,000 | 15 |
| C61 | 5,300 | 15 |

Diodes:
CR1–CR4 (3 ea.) ____ GEIN 1491.
CR5, CR6 _____ GE GRS 21–SA18D18.
CR7, 9, 11–14 _____ IN457A.
ZI _____ IN974.
Z2 _____ IN748.
Z3 _____ IN759.
CR 16–19 _____ IN253.

Transistors:
Q1 _____ 2N124
Q2 _____ 2N722
Q3 _____ 2N404
Q4 _____ 2N404
Q5 _____ 2N404
Q6 _____ 2N404
Q7 _____ 2N526
Q8 _____ 2N277
Q9 _____ 2N526

Transformers and inductor:
T1 _____ 1200 v. at 200 ma.
T2, T3 _____ Knight, Allied 62a–353
T4 _____ 12.6 v. at 2 a.
T5 _____ 7.5 v. at 4 a.
L1 _____ 2.3 H., 150 Ma., 60 ohms.

While the principles of the invention have been described above in connection with specific apparatus and applications, it is to be understood that this description is made only by way of example and not as a limitation on the scope of the invention.

I claim:

1. A regulated power supply for converting A.C. power to D.C. power having controlled voltage-current characteristics, said regulated power supply comprising a high voltage transformer, control reactor means for coupling the low side of said high voltage transformer to a source of A.C. power, full wave bridge rectifier means coupled to the high side of said high voltage transformer for providing full wave D.C. power, means coupled across said high side of said transformer operated responsive to an over voltage condition to short said transformer high side thereby protecting said bridge rectifiers, filter means coupled to the output of said bridge for decreasing the ripple of the output of said bridge, output terminals connected to the output of said filter for coupling a load to said regulated power supply and feedback means connected between said output terminals and said control reactor for automatically varying the current through said reactor as a function of the current and voltage provided at said output terminals.

2. A regulated power supply for providing D.C. power having rigorously controlled output voltage-current characteristics, said power supply comprising a high voltage transformer for providing a high A.C. voltage output responsive to A.C. line voltage inputs, control reactor means serially connected between a source of A.C. line voltage and said high voltage transformer, full wave rectifier means coupled to said high voltage transformer operated responsive to said high A.C. voltage from said transformer for providing rectified full wave high D.C. voltage, electronic filter means included in said rectifier means operated responsive to said rectified D.C. voltage for filtering and regulating the said D.C. voltage, and feedback amplifier means operated responsive to variations in the filter voltage and current output for controlling the current flow through said control reactor to regulate the voltage-current characteristics of the filter.

3. The regulated power supply of claim 9 wherein said feedback amplifier includes a separate regulated power supply for providing bias voltage for said feedback amplifier.

4. The regulated power supply of claim 10 wherein said separate regulated supply comprises first low voltage transformer means, low voltage full wave rectifier means coupled to the said first low voltage transformer for providing a D.C. voltage, ripple filter means connected to said low voltage rectifier means for filtering out the ripple voltage, transistor means serially connected with its emitter coupled to the output of said separate regulated supply and its collector connected to said filter, and zener means for biasing the base of said transistor to provide regulated voltage at the emitter of said transistor.

5. A regulated power supply for providing D.C. power having controlled voltage-current characteristics, said power supply comprising rectifier means operated responsive to A.C. power input for providing filtered D.C. power output, control transformer reactor means having a first winding serially coupling said rectifier means to a source of A.C. power, feedback amplifier means, D.C. supply means, means included in said feedback amplifier means for variably coupling said D.C. supply means to the second winding of said control transformer, means for coupling said feedback amplifier to the positive and negative outputs of said rectifier means, current sensing means in said amplifier for detecting variations in the output current of said power supply, voltage sensing means in said amplifier for detecting variations in the output voltage of said power supply and D.C. current control means in said amplifier operated responsive to variations of said current and voltage to control the D.C. current in said second winding to compensate for said voltage and current variations.

6. The power supply of claim 13 wherein said current sensing means comprises a first transistor amplifier and resistor voltage divider network means operated responsive to variations in said output current for changing the bias of said first transistor amplifier.

7. The power supply of claim 14 wherein said resistor voltage divider network means is connected across the output of said power supply.

8. The power supply of claim 14 wherein said voltage sensing means comprises a second transistor amplifier and another voltage divider network means operated responsive to variations in said supply output voltage for changing the bias on said second transistor amplifier.

9. The power supply of claim 16 wherein comparative transistor means are provided for comparing the variations of the D.C. voltage output and the D.C. current output to control the D.C. current in the second winding as a function of the simultaneous variations in the output voltage and current.

References Cited

UNITED STATES PATENTS

| 3,087,106 | 4/1963 | Baude et al. | 317—33 X |
|---|---|---|---|
| 2,903,640 | 9/1959 | Bixey | 321—25 X |
| 3,042,848 | 7/1962 | Muchnick et al. | 321—25 X |
| 3,214,668 | 10/1965 | Brinster | 323—22 |

FOREIGN PATENTS 593,049   5/1959   Italy.

OTHER REFERENCES

Honeywell, Application Notes, Semi-Conductor Products, "Power Transistor 'Ripple Clipper' Filter for High-Current D.C. Power Supply Use," 3 pp. Mar. 15, 1959.

JOHN F. COUCH, *Primary Examiner.*

W. H. BEHA, *Assistant Examiner.*